Feb. 22, 1966 R. KOBLER 3,236,954

AUTOMATIC REPERTORY TELEPHONE DIALING APPARATUS

Filed Aug. 6, 1962 2 Sheets-Sheet 1

INVENTOR
RICHARD KOBLER

BY George H. Fritzinger

AGENT

Feb. 22, 1966 R. KOBLER 3,236,954

AUTOMATIC REPERTORY TELEPHONE DIALING APPARATUS

Filed Aug. 6, 1962 2 Sheets-Sheet 2

INVENTOR
RICHARD KOBLER
BY George H. Fritzinger
AGENT

1

3,236,954
AUTOMATIC REPERTORY TELEPHONE DIALING APPARATUS

Richard Kobler, West Orange, N.J., assignor, by mesne assignments, to DASA Corporation, Andover, Mass., a corporation of California Filed Aug. 6, 1962, Ser. No. 215,217
6 Claims. (Cl. 179—90)

This invention relates to improvements in automatic repertory dialing systems in which telephone subscribers numbers are recorded and then reproduced selectively to complete telephone switching connections with individual telephone subscribers.

The invention relates particularly to improvements in automatic repertory dialing systems of the character described in the Kobler et al., Patent No. 3,040,133, issued June 19, 1962, and in the pending application of Richard Kobler, Serial No. 829,881, filed July 27, 1959, now Patent No. 3,104,285, both of which have a common assignee with the present application.

In the foregoing systems the digits and letters of telephone subscribers numbers are recorded on a magnetic record medium in code form, preferably as time bands of approximately 40 milliseconds duration for the digit "1," 140 milliseconds for the digit "2," 240 milliseconds for the digit "3," etc. These time or signal bands are separated on the record medium by erased or non-recorded interdigital spaces normally 550 milliseconds long. However, when recording a telephone number which is to be dialed through a PBX system the telephone number is preceded by an "out-number" representing an outside trunk line. This out number must be separated from the first letter or digit of the subscriber's telephone number by a longer interdigital space, typically about three seconds in duration referred to as "access time," to provide time for a dial tone after the out-number is dialed and before the dialing of the subscriber's number is started.

However, some telephone users as in industrial plants have possession also of a direct line during the day or at least after regular working hours. Thus, sometimes the user will want to dial directly—i.e., without first dialing the out-number—and at other times he will want to dial with the out-number as when his telephone is connected through a PBX system, else he will dial incorrectly and fail to get the number he is calling.

The present invention provides a simple attachment for an automatic repertory dialing apparatus by which the user can condition the apparatus to dial with or without an out-number depending upon whether the user shifts a selector switch into a "PBX" or a "direct" position.

In carrying out the invention each subscriber's telephone number which might ever be dialed through a PBX system is recorded with a preceding out-number and access time. In the machine for reproducing the recorded numbers there is provided in the carriage system by which a traveling movement is produced between the reproducer head and the record medium a mechanically operable switch for disabling or muting the reproducer while the head is scanning the portion of the record track bearing the recordation of the out-number. Associated with this disabling apparatus is a manual selector switch which can be thrown to a "PBX" position to render the disabling apparatus inoperable or to a "direct" position to render the disabling apparatus operable.

An object of the invention is therefore to provide a repertory telephone dialing apparatus with selectively operable means by which the user can automatically dial telephone numbers with preceding out-numbers to make connections through trunk lines or without out-numbers to make direct line connections, as the situation may require.

2

These and other objects and features of the invention will be apparent from the following description and the appended claims.

In the description of my invention reference is had to the accompanying drawings, of which:

Figure 1:
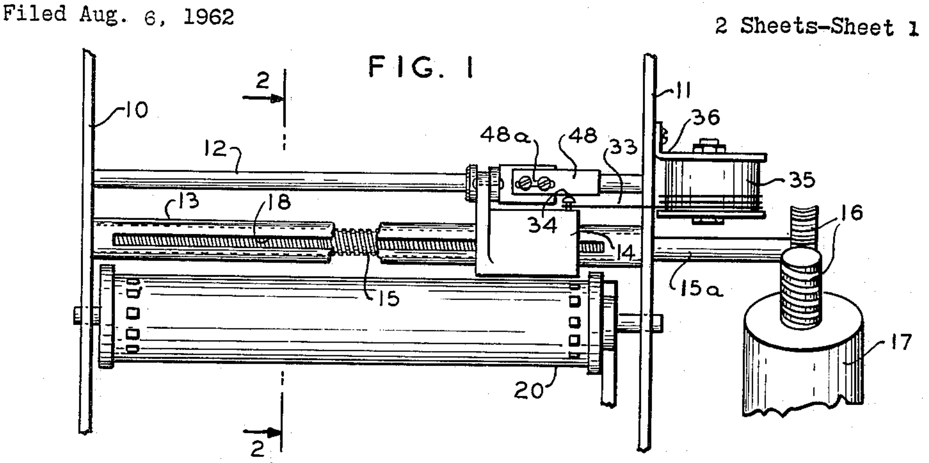
FIGURE 1 is a fractional plan view of an automatic repertory telephone dialing machine incorporating my invention.
Figure 2:
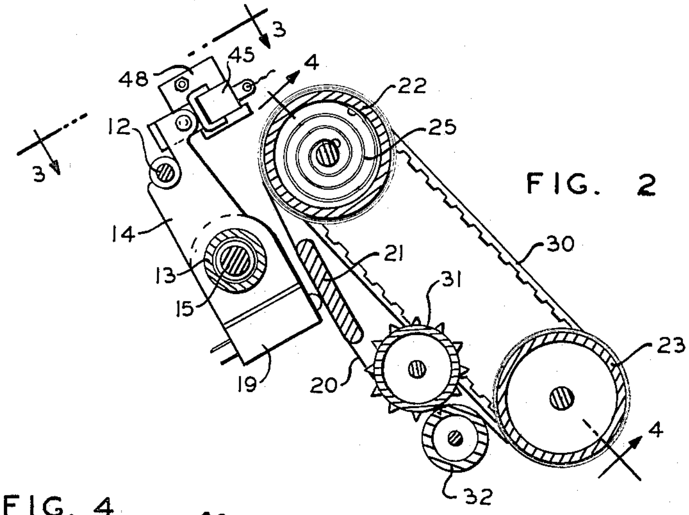
FIGURE 2 is a fractional sectional view of this machine as seen from the line 2—2 of FIGURE 1.

The repertory dialing machine fractionally shown in the accompanying drawings may have a frame comprising two side plates 10 and 11 supporting a guide rod 12 and a tubular guide rod 13 therebetween for a head carriage 14. Extending through the tubular guide rod is a feed screw 15 having a shaft 15*a* extending beyond the right frame plate 11 and coupled by worm gearing 16 to a motor 17. The tubular guide rod has a slot 18 lengthwise thereof through which extends a circular feed nut (not shown) on the carriage to couple the carriage to the feed screw and cause the carriage to be driven to the left by the drive motor when the feed nut is in a locked condition. On the lower portion of the carriage is a magnetic head 19 having pole tips engaging a tape record medium 20 backed by a platen 21 supported by the side frame plates.

Figure 4:
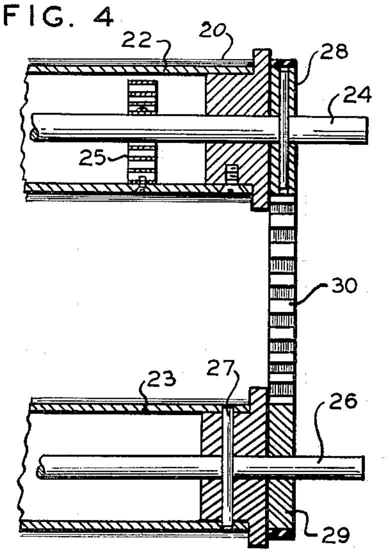
FIGURE 4 is a fractional sectional view taken on the line 4—4 of FIGURE 2.

The tape medium 20 is preferably a magnetically coated flexible sheet material supported in the manner of a scroll between a supply roller 22 and a take-up roller 23. The supply roller 22 comprises a cylinder with flanged end walls (FIGURE 4) mounted rotatably on a shaft 24 itself journaled in the side frame plates. The cylinder is coupled to the shaft by an internal helical spring 25. The take-up roller comprises also a cylinder having flanged end walls mounted on a shaft 26 journaled in the side frame plates but in this case the cylinder is secured rigidly to the supporting shaft by a cross pin 27. Beyond the flanged end walls of the rollers 22 and 23 are gear wheels 28 and 29 respectively. These gear wheels are intercoupled by a gear type belt 30. One end of the tape medium 20 is secured to the supply roller 22. After winding the supply of tape on the roller 22 the other end of the tape is drawn downwardly across the platen 21 while the shaft 24 is held from turning so as to wind up the helical spring 25. The lower end portion of the tape is then led around the sprocket roller 31 and across the idler roller 32 both of which are journaled between the side frame plates, and then the end of the tape is secured to the take-up roller 23 by suitable means not shown. The tensioning of the helical spring 23 holds the tape taut across the platen 21 and allows for a reducing diameter of the tape on the supply roll and an increasing diameter of the tape on the take-up roller as the tape is wound from the supply roller to the take-up roller. The tape may be driven by rotating the sprocket roller 31. Suitable indexing means (not shown) is provided to locate the tape always so that the head 19 is in registration with one or another of the tracks on the tape.

As the carriage 14 is driven to the left the head 19 scans a track on the tape medium from left to right either to record a telephone number in code form on the tape or to reproduce the recorded number therefrom, depending upon whether the machine is conditioned to operate as a recorder or as a reproducer. As the carriage is driven across the tape medium a cord 33 secured at 34 to the carriage is unwound from a spring tensioned drum 35 mounted by a bracket 36 to the right frame plate 11. Upon completing the recordation or reproduction of a telephone number on the tape, the lock on the feed nut is released and the carriage is snapped back home by the drum 35. Details of operation of the machine as a recorder need not be herein described since the present invention is primarily concerned with the reproducing operation and reference may be had to the aforementioned Kobler et al. Patent No. 3,040,133 as to details of operation of the machine as a recorder.

Figure 6:
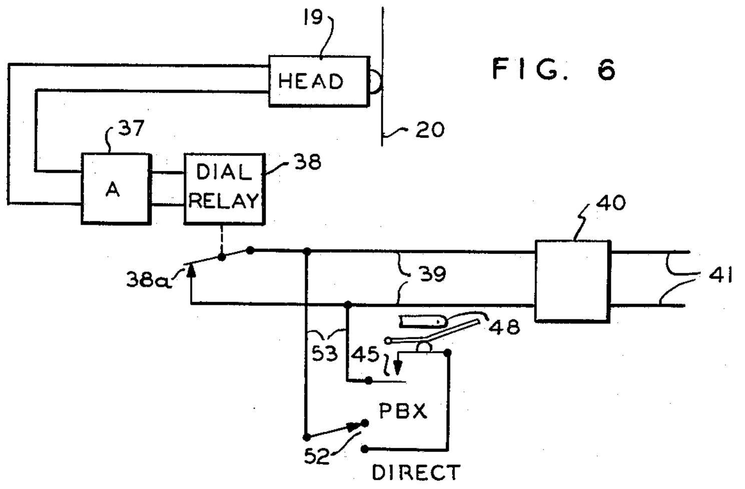
FIGURE 6 is a schematic circuit diagram of the invention.

The code form of the recorded digits of telephone numbers may comprise groups of pulses of numbers depending upon the respective digits of which the pulses are typically at a rate of ten per second and each of a duration of approximately sixty milliseconds. Alternatively, each digit may be represented by a continuous signal band of a duration depending on the respective digit as beforementioned and as is described in the aforesaid Kobler et al. Patent No. 3,040,133. During a reproducing operation the coded signals are picked up by the head 19 and fed through an amplifier 37 to a dial relay 38 (FIGURE 6). The dial relay has a pair of contacts 38*a* in a line 39. If the digits of a telephone number are recorded as groups of pulses the dial relay 38 is pulsed accordingly when the telephone number is reproduced in which case the relay switch 38*a* is connected directly in the telephone line. On the other hand, if the digits are recorded as signal bands then the line 39 is led to a solenoid controlled converter 40 which converts the signal bands into groups of dial pulses and feeds the same into a telephone line 41 as described in the aforesaid Kobler et al. Patent No. 3,040,133.

Figure 5:
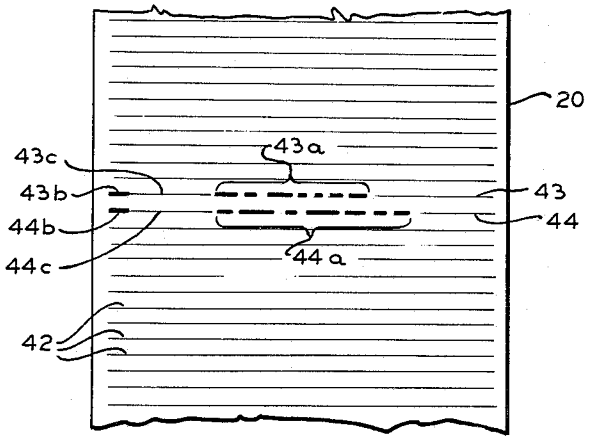
FIGURE 5 is a view of a portion of the record medium illustrating by dash lines the recordation of successive digits of subscribers telephone numbers along successive tracks.

In FIGURE 5 successive transverse tracks on the tape record medium 20 are represented by the fine lines 42. In the tracks 43 and 44 recorded telephone numbers are designated by successive solid lines representing continuous signal bands as the code form of the respective digits of the telephone numbers.

The telephone numbers recorded in tracks 43 and 44 each comprise seven digits represented by the band groups 43*a* and 44*a*. Preceding the telephone numbers are signal bands 43*b* and 44*b* representing the "out-numbers." These out-numbers are separated from the telephone numbers proper by unrecorded spaces 43*c* and 44*c* to provide the necessary access time for dial tone when the respective numbers are reproduced.

Figure 3:
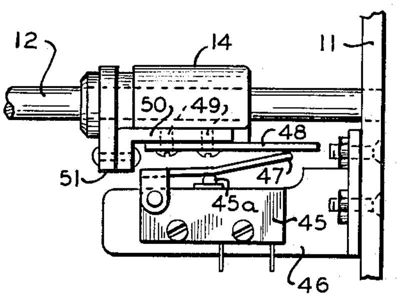
FIGURE 3 is a top view to enlarged scale of the carriage-operated disabling or muting switch of the invention as seen from the line 3—3 of FIGURE 2.

As before explained, some telephone users must at times dial through a PBX system and at other times through direct line connections. The present invention contemplates that in such event all telephone subscribers numbers are recorded without numbers and access time, and the reproducing machine is equipped with a disabling apparatus by which the machine can be muted or disabled at will during the scanning of the initial portion of a track bearing the recorded out-numbers. This selector apparatus may comprise simply a switch 45 mounted on a bracket 46 secured to the inner side of the side frame plate 11 (FIGURE 3) for operation by the carriage through its initial portion of travel from home position. The switch may be of the micro type having a button 45*a* operable by a lever 47. The tip of the lever 47 extends into the path of a finger 48 held by two screws 49 to a bracket 50 on a side arm 51 of the carriage 14. The finger 48 extends in the direction of travel of the carriage and has a slot 48*a* lengthwise thereof through which extend the screws 49 to hold the finger to the bracket 50. Thus, upon loosening the screws 49 the finger may be adjusted along the path of the carriage and then secured in place by tightening the screws 49. By this adjustment the length of travel of the carriage from home position over which the switch 45 is held operated can be preset. This adjustment is made so that the switch 45 is held closed throughout the distance of travel of the head 19 to scan the portion of the track bearing the recorded out-number. As shown in FIGURE 6 the switch 45 is connected serially with a manual switch 52 in a line 53 connected across the line 39 controlled by the dial relay. When the manual switch 52 is in its closed or "direct" position the switch 45 will mute the reproducer during the scanning of the recorded out-number. Thus, in this condition the machine is adapted for direct line dialing. On the other hand, when the manual switch 52 is in its open or "PBX" position the shunt circuit 53 is at all times open so that the carriage operated switch 45 has no control over the reproducer. As the head now scans a selected track to dial a subscriber's number the "out-number" is first reproduced and fed out into the line to make a trunk selection, a suitable access time is then provided for dial tone and thereupon the subscriber's number itself is dialed.

It will be understood that the control circuit 53 of the carriage operated switch 45 may alternatively be connected to the input side of the dial relay 38 as across the input or output of the amplifier 37 or into the amplifier itself to mute the relay operation. In the claims, the language that the carriage operated switch means is connected to the dial relay is intended to comprehend such other equivalent alternative connection.

The description of my invention is intended to be illustrative and not necessarily limitative of my invention since the same is subject to changes and modifications without departure from the scope of my invention, which I endeavor to express according to the following claims.

I claim:

1. The combination of reproducing means selectively shiftable relative to the record medium to bring a reproducer head of the reproducing means into registration with selected tracks respectively bearing a recorded digit or digits representing an out-number followed by a series of recorded digits representing a subscriber's telephone number, means for advancing the reproducing means from a home position to scan the selected track, and means manually settable respectively to enable and disable said reproducing means while the same is scanning the track portion bearing the recorded out-number whereby to adapt the reproducer to dial through a PBX system or to dial directly.

2. The combination set forth in claim 1 wherein said manually settable means comprises a switch operated by said reproducing means in its initial scanning movement of a recorded out-number for muting the reproducer, and a manually operable switch connected in circuit with said muting switch.

3. The combination set forth in claim 1 including adjustable means for setting the length of scanning movement of said reproducing means from home position over which said manually settable means has control over said reproducing means.

4. A machine for reproducing telephone subscribers numbers, comprising a record medium having a plurality of subscribers numbers recorded thereon in side-by-side relationship, each of said subscribers numbers comprising in sequence a digit or digits recorded in code form representing an out-number, an unrecorded space representing access time for dial tone and a series of digits recorded in code form separated by interdigital spaces and representing the subscriber's telephone number, a reproducer head, shift means for selectively bringing said head into registration with tracks bearing said respective subscribers numbers, means for relatively advancing said head to the record medium to cause the same to reproduce the coded signals in the selected track, a dial relay, an amplifier circuit connected between said head and dial relay, switch means controlled by the relative movement of the head to the record medium to cause the switch means to assume one position while the head is in the initial portion of its travel from home position wherein it scans the recorded out-number and another position when the head scans the subscribers telephone number, means connecting said switch means to said dial relay to render the dial relay ineffective while said switch means is in said one position, and a manual selector switch connected in circuit with said switch means respectively to render the switch means operable and inoperable to perform its stated function.

5. The machine set forth in claim 4 including adjustable means to set the length of travel of said head from home position wherein said switch means is maintained in said one position.

6. The machine set forth in claim 4 wherein said switch means is connected across said dial relay circuit to short the same when said switch means is closed and wherein said manual selector switch is connected in series with said switch means to disconnect the latter from said dial relay when said selector switch is open.

References Cited by the Examiner

UNITED STATES PATENTS 3,040,133 1/1962 Kobler et al. -------- 179—90

ROBERT H. ROSE, *Primary Examiner.*

H. W. GARNER, S. J. BOR, *Assistant Examiners.*